US012654393B2

(12) United States Patent
Peradotto et al.

(10) Patent No.: US 12,654,393 B2
(45) Date of Patent: *Jun. 16, 2026

(54) ADDITIVE MANUFACTURING SYSTEMS AND METHODS FOR TOP AND SIDE COMPRESSION OF MATERIAL DURING MATERIAL DEPOSITION

(71) Applicant: GE Avio S.r.l., Rivalta di Torino (IT)

(72) Inventors: Edoardo Maria Peradotto, Turin (IT); Emanuele Quarona, Castiglione Torinese (IT); Alessandro De Grassi, Ancona (IT)

(73) Assignee: GE Avio S.r.l., Rivalta di Torino (IT)

( * ) Notice: Subject to any disclaimer, the term of this patent is extended or adjusted under 35 U.S.C. 154(b) by 110 days.

This patent is subject to a terminal disclaimer.

(21) Appl. No.: 18/218,677

(22) Filed: Jul. 6, 2023

(65) Prior Publication Data

US 2024/0009923 A1     Jan. 11, 2024

(30) Foreign Application Priority Data

Jul. 8, 2022     (IT) ......................... 102022000014452

(51) Int. Cl.
*B29C 64/218*          (2017.01)
*B29C 64/118*          (2017.01)
(Continued)

(52) U.S. Cl.
CPC .......... *B29C 64/218* (2017.08); *B29C 64/118* (2017.08); *B33Y 10/00* (2014.12); *B33Y 30/00* (2014.12)

(58) Field of Classification Search
CPC .......... B22F 12/60; B22F 12/63; B22F 12/30; B22F 12/33; B22F 12/37; B22F 10/50;
(Continued)

(56) References Cited

U.S. PATENT DOCUMENTS 2,925,003 A  *  2/1960  Mcmullen ................ B21H 1/06
                                                        72/104
3,340,055 A      9/1967  Cloran et al.
(Continued)

FOREIGN PATENT DOCUMENTS

CN          101817121 B      9/2010
CN          112496344 A  *  3/2021    .............. B22F 3/105
(Continued)

OTHER PUBLICATIONS

Espacenet machine translation of Fischer et al., EP 3266543 B1 (originally published Aug. 7, 2019) (Year: 2019).*
(Continued)

*Primary Examiner* — Susan D Leong
*Assistant Examiner* — Jennifer L Groux
(74) *Attorney, Agent, or Firm* — Dinsmore & Shohl LLP

(57)          ABSTRACT

An additive manufacturing system for producing a component includes a deposition assembly having a deposition head through which melted feedstock material is deposited, and a compression rig comprising a compression head supporting an inside roller, an outside roller opposing the inside roller, and a top roller, the inside roller applying a compressive load onto an interior side surface of the component, the outside roller applying a compressive load onto an exterior side surface of the component, and the top roller applying a compressive load onto a top surface of the component.

13 Claims, 5 Drawing Sheets

(51) Int. Cl.
   B33Y 10/00 (2015.01)
   B33Y 30/00 (2015.01)

(58) Field of Classification Search
   CPC ............ B22F 3/17–18; B22F 2003/175; B22F
   2003/185; B22F 10/18–25; B22F 10/60;
   B22F 10/66; B23K 26/342; B29C 64/218;
   B29C 64/188; B29C 64/194; B29C
   64/245; B29C 43/46; B33Y 30/00; B33Y
   40/00; B33Y 40/20; B21H 1/06
   See application file for complete search history.

(56) References Cited

U.S. PATENT DOCUMENTS

| | | | |
|---|---|---|---|
| 3,686,376 | A | 8/1972 | Ayers |
| 6,459,951 | B1 | 10/2002 | Griffith et al. |
| 9,302,338 | B2 | 4/2016 | Zhang et al. |
| 9,555,475 | B2 | 1/2017 | Sidhu et al. |
| 9,751,260 | B2 | 9/2017 | Dietrich et al. |
| 9,981,427 | B2 | 5/2018 | Huang |
| 10,092,975 | B2 | 10/2018 | Twelves, Jr. et al. |
| 10,189,214 | B2 | 1/2019 | Ho Yew Chi et al. |
| 10,195,666 | B1 | 2/2019 | Barnet et al. |
| 10,710,159 | B2 | 7/2020 | Corsmeier |
| 10,937,572 | B2 | 3/2021 | Perigo et al. |
| 10,940,533 | B2 | 3/2021 | Hudelson et al. |
| 11,065,808 | B2 | 7/2021 | Susnjara et al. |
| 11,135,770 | B2 | 10/2021 | Budge |
| 2013/0189435 | A1 | 7/2013 | Mackie et al. |
| 2013/0197683 | A1 | 8/2013 | Zhang et al. |
| 2016/0151833 | A1* | 6/2016 | Tsao ........................ B23K 9/04 |
| | | | 219/136 |
| 2019/0022937 | A1 | 1/2019 | Stelter et al. |
| 2019/0210152 | A1* | 7/2019 | Konitzer ................ B33Y 30/00 |
| 2019/0308371 | A1 | 10/2019 | Knecht et al. |
| 2020/0331203 | A1 | 10/2020 | Verma |
| 2020/0361141 | A1* | 11/2020 | Stadlmayr ............. B29C 64/245 |
| 2021/0178680 | A1* | 6/2021 | Acosta .................. F03D 1/0675 |
| 2021/0197255 | A1 | 7/2021 | Ma et al. |
| 2021/0347115 | A1 | 11/2021 | Fetfatsidis et al. |
| 2021/0354377 | A1 | 11/2021 | Baranowski et al. |
| 2021/0379663 | A1 | 12/2021 | Tanaka et al. |
| 2023/0356315 | A1* | 11/2023 | Watson .................... B23K 9/32 |
| 2024/0009740 | A1* | 1/2024 | Peradotto .............. B29C 64/209 |
| 2024/0149526 | A1* | 5/2024 | Scialpi .................. B29C 64/218 |

FOREIGN PATENT DOCUMENTS

| | | | | |
|---|---|---|---|---|
| EP | 3266543 | B1 | 8/2019 | |
| GB | 2491472 | A | 12/2012 | |
| WO | 9611117 | A1 | 4/1996 | |
| WO | WO-2017150186 | A1 * | 9/2017 | ............. B29C 67/00 |
| WO | WO-2022186704 | A1 * | 9/2022 | ............. B22F 12/63 |

OTHER PUBLICATIONS

Espacenet machine translation of Ueda et al., WO 2017150186 A1 (originally published Sep. 8, 2017) (Year: 2017).*
Defensive Publication Published Apr. 15, 2021 Entitled "Apparatus and Methods for Real-Time Stress Control in Additive Manufacturing" (https://priorart.ip.com/IPCOM/000265492).
Italian Search Report for Application 102022000014452 mail date Feb. 22, 2023.
European Patent Office Action for Application No. 23182715.5 dated Sep. 15, 2025 (5 pages).

* cited by examiner

ADDITIVE MANUFACTURING SYSTEMS AND METHODS FOR TOP AND SIDE COMPRESSION OF MATERIAL DURING MATERIAL DEPOSITION

CROSS-REFERENCE TO RELATED APPLICATION

This application claims priority to Italian Patent Application Number 102022000014452 filed Jul. 8, 2022, which is hereby incorporated herein by reference in its entirety.

TECHNICAL FIELD

The present disclosure generally relates to additive manufacturing systems and methods, more particularly, to systems and methods that apply compression forces onto deposited material during material deposition.

BACKGROUND

Additive manufacturing is a suite of emerging technologies that may be used to fabricate three-dimensional objects directly from digital models through an additive process, typically by depositing material layer upon layer and joining successive layers in place. Directed energy deposition ("DED") is a type of additive manufacturing process utilized to fabricate new components and/or to repair or add additional material to existing components. Using DED, components can be fabricated layer-by-layer using a directed flow of feedstock material from a deposition nozzle. DED apparatuses use a focused energy source, such as a laser or electron beam, to melt the feedstock material and simultaneously deposit the melted material on a specified surface, where such melted material solidifies and fuses with other deposited materials, to thereby form the component layer-by-layer.

The energy source is provided in the deposition nozzle, which includes one or more material delivery nozzles which converge at the point of material deposition and where the energy source is focused. The feedstock material is melted as it exits the deposition nozzle and is deposited on a build table or on a previously deposited layer of material.

DED apparatuses may also be configured to apply compression to each layer or a set of layers after being deposited. These types of DED apparatuses generally include a fixed build table, a large robotic arm supporting the deposition nozzle that may articulate over the table so as to deposit the layer of material from the deposition nozzle during a deposition phase, and a compression apparatus that may subsequently articulate over the build table to apply compression during a compression phase such as by, for example, peening, hammering, rolling, and the like.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
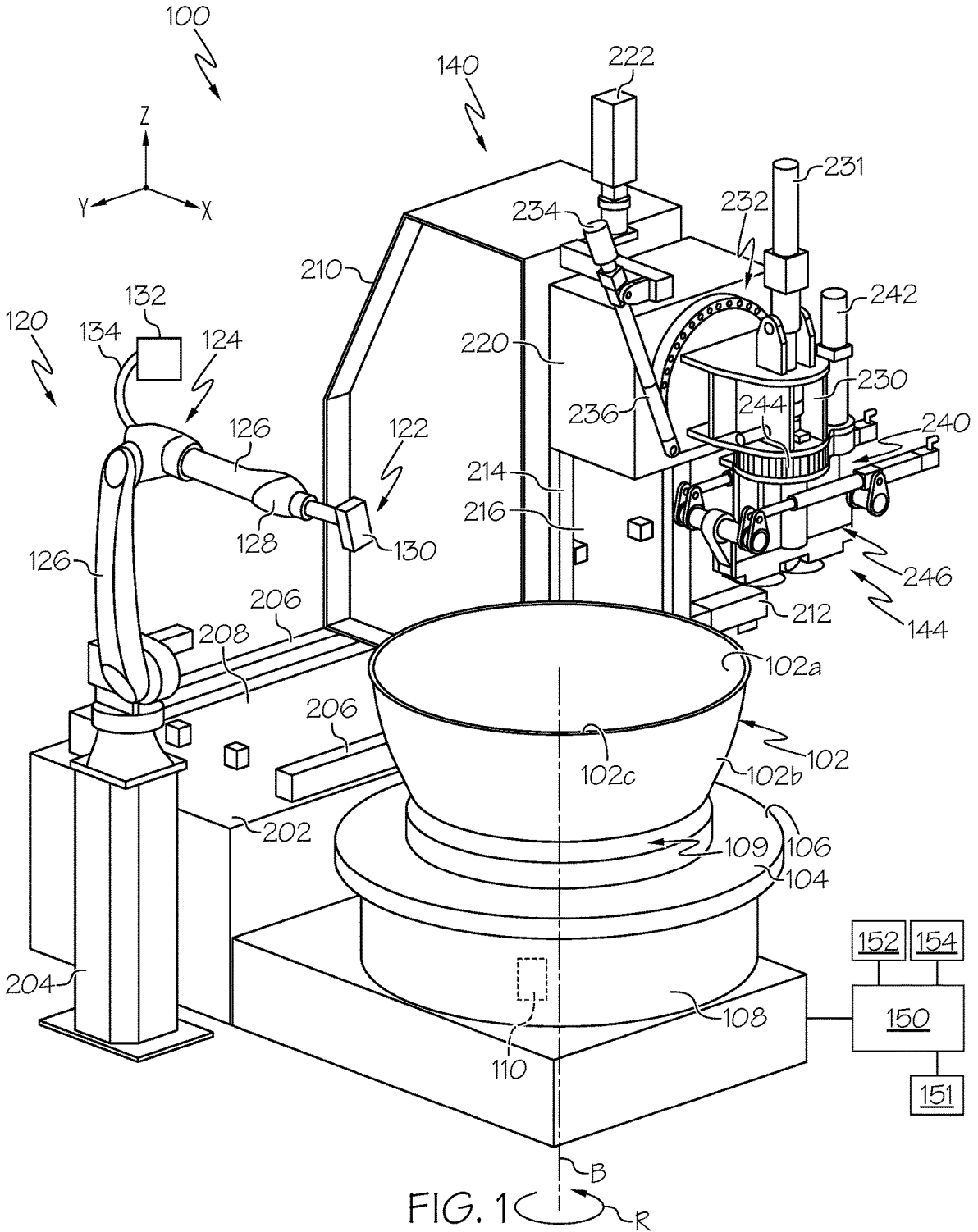
FIG. 1 schematically depicts a perspective view of an additive manufacturing system, according to one or more embodiments shown and described herein.

Embodiments described herein are directed to additive manufacturing systems for producing a component and methods for introducing compression in deposited material while simultaneously conducting material deposition. The illustrated systems include a rotary build table configured to rotate about a vertical axis of the rotary build table, a deposition assembly having a deposition head through which a stream of melted feedstock material is deposited, and a compression rig including a compression head supporting an inside roller, an outside roller opposing the inside roller, and a top roller, the inside roller. The rollers are configured to apply a compressive load on surfaces of a component built on a build surface of the rotary build table. Various embodiments of the systems and the operation of the systems are described in more detail herein. Whenever possible, the same reference numerals will be used throughout the drawings to refer to the same or like parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

With conventional DED apparatus designs, the deposition phase and the compression phase occur sequentially, one after another, and cannot act continuously or simultaneously. When the deposition phase is ongoing, the compression equipment is positioned outside of the working volume waiting for conclusion of the deposition phase, and vice versa. Therefore, the total processing time of a component is the sum of the deposition time and the compression time, which can be quite time consuming and adversely impact the overall cost of manufacturing. Furthermore, with this type of design, the compression will be applied on a material layer having variable temperature, which can cause unevenness at the microstructure level. Moreover, because of the gap in time between deposition and compression, existing DED systems and techniques cannot produce components with forging-like qualities or characteristics.

The embodiments described herein provide directed energy deposition DED additive manufacturing systems having a deposition head and compression rig that may be utilized simultaneously without interfering with each other. The presently disclosed embodiments are capable of implementing a local forging process within a DED process.

Referring now to FIG. 1, a DED additive manufacturing system 100 (hereinafter, the system 100) according to one or more embodiments of the present disclosure is illustrated. The system 100 is configured to construct or build a component 102 from a feedstock material. The component 102 has an interior side surface 102a, an opposite exterior side surface 102b, and a layer or surface 102c being built. In the illustrated example, the component 102 is a cylindrically shaped component, but in other examples, the component 102 may have a different geometry.

As illustrated, the system 100 includes a build table 104. At least a portion of the build table 104 is configured to rotate about a build table axis B of the build table 104 extending parallel to the Z-axis of the coordinate axis, thereby rotating the component 102 supported on the build table 104. Thus, the build table 104 is a rotary build table. In particular, the build table 104 defines a build surface 106 on which the component 102 is built and supported. In the illustrated embodiment, the build table 104 is disposed on a base 108. The base 108 may include an actuator 110 that rotates the build table 104 about the build table axis B in a clockwise or counterclockwise rotation direction. In the illustrated embodiment, the actuator 110 rotates the build table 104 in a counterclockwise direction R about the build table axis B. Also, as hereinafter described, the actuator 110 rotates the build table 104 at a variable rotation speed. In some examples, the base 108 is further configured to translate the build table 104 vertically along the build table axis B. In the illustrated embodiment, and as discussed in more detail herein, a platform 109 is provided on the build surface 106 of the build table 104 and the component 102 is built on the platform 109 rather than directly on the build surface 106 itself.

The system 100 also includes a deposition assembly 120. The deposition assembly 120 has a deposition head 122 through which a stream of melted feedstock material may be deposited to fabricate the component 102. As described herein, the melted feedstock material is deposited or output from the deposition head 122 at a deposition rate. The deposition assembly 120 includes a structure that adjustably and movably supports the deposition head 122. In the illustrated example, the deposition assembly 120 includes a robotic arm 124 including a plurality of links 126 that may articulate relative to each other so as to adjust the position of the deposition head 122 which is supported on a distal most link 128 of the plurality of links 126. Accordingly, it should be understood that the deposition head 122 and the build table 104 are movable relative to each other. For example, the robotic arm 124 may include one or more actuators that rotate the links 126, 128 of the robotic arm 124 relative to one another so as to move the robotic arm 124 and the deposition head 122 supported thereon relative to the build table 104. It will be appreciated that the robotic arm 124 may have various other configurations for moving and adjusting a position of the deposition head 122 in multiple degrees of freedom without departing from the present disclosure.

The deposition assembly 120 includes an energy source 130 and a material source 132. The material source 132 is configured to convey feedstock material (e.g., metal or polymer-based wires) to the deposition head 122 where it is deposited on the build table 104. In the illustrated embodiment, the material source 132 is a material spool and feeder system configured to convey a wire 134 to the deposition head 122. Thus, the material source 132 may house the wire 134 that is fed to the deposition head 122. For example, the wire 134 may be routed externally of the robotic arm 124 to the deposition head 122 or through an internal cavity of the robotic arm 124 that connects to the deposition head 122. In embodiments, the wire 134 may be a metal or polymer-based wire. In other embodiments, rather than being a material spool and feeder system configured to convey the wire 134, the material source 132 may include a pressurized powder source that conveys a pressurized stream of powder feedstock material to one or more material delivery devices (e.g., nozzles, valves, or the like) of the deposition head 122. Any suitable feedstock material capable of being used in DED processes may be used consistent with the present disclosure.

The energy source 130 may take various forms depending on the implementation. In the illustrated example, the energy source 130 is a plasma transferred arc heat source. In other examples, the energy source 130 may include a laser source and optics configured to direct a laser beam having a desired energy density to the build surface 106 of the build table 104. In some examples, the energy source 130 may include an electron emitter connected to a power supply and at least one focusing coil configured to direct an electron beam to the component 102 being constructed on the build surface 106 of the build table 104. In such embodiments, the build table 104 may be placed in a build chamber (not depicted) under a vacuum or having an oxygen-reduced environment. However, the energy source 130 may take various other forms, such as a plasma source, an electron beam source, a resistance heater, etc.

It should be understood that the system 100 may include any number of energy sources and material sources in accordance with the present disclosure. Additionally, feedstock material from the material source 132 may be routed to the deposition head 122 in various ways for emission onto the build table 104. For example, in embodiments, the wire 134 from the material source 132 may be divided into two or more material feeds that are routed through the robotic arm 124 into the deposition head 122. Each material feed may exit the deposition head 122 at a separate delivery nozzle. In addition, multiple energy sources may be utilized to forming the same melt pool such as, for example, an electric arc heat source and a laser.

In operation, one or more streams of feedstock material are fed into a path of an energy beam from the energy source 130 and emitted by the deposition head 122 as a stream of melted feedstock. In particular, at points of overlap between the energy beam and the streams of feedstock material where the energy beam possesses the requisite energy density, the energy may heat the feedstock material to a sufficient extent to form a melt pool on the build surface 106. Melted feedstock material may continuously be fed through and deposited from the deposition head 122 such that the melt pool forms a pattern corresponding to the movement pattern of the deposition head 122 and the build table 104. Movements of the deposition head 122 and the build table 104 may be determined based on a desired shape of the component 102 being built such that, as the melt pool cools, the feedstock material solidifies to form a portion of the component 102. For example, rotation of the build table 104 about the build table axis B as the deposition head 122 deposits the melt pool results in a circular shaped stream of melted feedstock material that, as the build table 104 continuously rotates over time, will layer upon itself and build a cylindrical shaped component, such as the component 102. Also, the robotic arm 124 may position the deposition head 122 radially towards or away from the build table axis B so as to create a non-circular shaped component with a varying size and diameter as illustrated.

The system 100 further includes a compression rig 140. The compression rig 140 is positioned proximate the deposition assembly 120 and is operable to continuously apply a compressive load to the deposited feedstock material which forms the component 102. As described herein, the compression rig 140 is configured to apply a compressive load to the component 102 (i.e., a compression phase) during or simultaneous with a deposition phase where the deposition assembly 120 is depositing the stream of melted feedstock material to build the component 102. In the illustrated embodiment, the compression rig 140 includes at least one actuator and a load source 144, as further described below.

Generally, the at least one actuator is configured to move and manipulate the orientation of the load source 144 relative to the portion of the component 102 to which a compressive load is to be applied. The load source 144 applies a force to the deposited material to introduce the required strain level in the deposited layer and/or improve mechanical properties of the component 102.

As described herein, the robotic arm 124 is operable to position the deposition head 122 in close proximity of the load source 144 and/or the compression rig 140 is operable to position the load source 144 in close proximity of the deposition head 122. The distance between the load source 144 and the deposition head 122 may be increased if cold rolling is intended, for example, by rotating the build table 104 in an opposite clockwise direction. In this manner, it is possible to operate the deposition head 122 to deposit melted feedstock material in the melt pool while the load source 144 applies the compressive load to the component 102, with the load source 144 trailing the deposition head 122 such that the load source 144 applies load to previously deposited material a short time thereafter depending on the rotation speed of the build table 104. Thus, the compression rig 140 may apply the compressive load to the component 102 at the same time as the deposition head 122 is creating the melt pool, at least in close proximity to the melt pool of the component 102. Not only does this decrease machine cycle time, but also allows the compressive load to be applied to the component 102 at a constant temperature and at a temperature suitable to provide the component 102 with forge-like qualities. A grain refinement mechanism responsible for the forge-like properties may be utilized to provide static or dynamic recrystallization. It should be appreciated that cold rolling is capable of producing static recrystallization when the material is first strained at an ambient temperature and then re-heated with a consequent grain refinement. The re-heat in DED is provided by the most recent layer deposition to the layer(s) below.

In embodiments, the system 100 may further include a controller 150. The controller 150 may be communicatively coupled to the build table 104, the deposition assembly 120, and/or the compression rig 140. Thus, the controller 150 may be in communication with the base 108, the robotic arm 124, and/or the compression rig 140 so as to control operation of the same. For example, the controller 150 may include a processor and memory storing computer readable instructions which, when executed by the processor, dynamically controls a rotation direction and/or a rotation speed of the build table 104 about the build table axis B, a vertical translation of the build table 104 along the build table axis B, a position and orientation of the deposition head 122 in space via the robotic arm 124, a position and orientation of the load source 144 in space, and/or a magnitude of compressive load applied by the load source 144. The controller 150 may also be configured to control a feed rate of the feedstock material being fed to the deposition head 122 and/or a deposition rate at which the stream of melted feedstock material is output from the deposition head 122.

In embodiments, the system 100 may have various sensors configured to communicate with the controller 150, and the controller 150 may utilize data from the various sensors to control operation of the build table 104, the deposition assembly 120, and/or the compression rig 140 as may be desired for fabricating a particular component 102. In some examples, a sensor system 151 may be provided that scans the component 102 so as to measure the dimensions of the component 102 as it is being formed. For example, lasers or cameras could be utilized to monitor the geometry of the component 102 and control the orientation of the deposition assembly 120 and/or the compression rig 140 based on that sensed data.

In embodiments, the system 100 includes a temperature sensor 152 and/or a stress sensor 154. The temperature sensor 152 may be configured to measure a surface temperature of the layer of feedstock material deposited via the deposition head 122 inside and/or outside of the melt pool. In some embodiments, the temperature sensor 152 may include at least one pyrometer or thermal camera configured to check the actual surface temperature of the deposited feedstock material. The temperature sensor 152 is communicably coupled to the controller 150 which includes control logic that evaluates the measurements of the temperature sensor 152. In embodiments, the controller 150 is configured to determine if a temperature of the feedstock material is suitable for a counterbalancing treatment via the load source 144. For example, a suitable temperature range for compressive load treatments may be determined based on material properties (e.g., plasticity, coefficient of thermal expansion, and the like) associated with the feedstock material deposited via the deposition head 122. In some embodiments, the controller 150 is configured to control relative position between the deposition head 122 and the load source 144 based on the measurements of the temperature sensor 152. For example, the controller 150 may cause movement of the deposition head 122 nearer to or further from the load source 144 so as to ensure that the compressive load is being applied to material having a desired constant temperature. If a measurement of the temperature sensor 152 indicates that a previously deposited feedstock material is not suitable for compression or not uniform with previously compressed feedstock material, the controller 150 may transmit control signals to the actuator 110 of the build table 104 to vary rotation speed and/or transmit control signals to the robotic arm 124 to adjust a positioning of the deposition head 122.

Referring still to FIG. 1, in embodiments, the stress sensor 154 may be configured to measure a distance to the component 102, which can be utilized by the controller 150 to measure strain in the layer of feedstock material before and/or after the compression treatments are performed via the load source 144. The stress sensor 154 is communicably coupled to the controller 150 which includes control logic that evaluates the readings of the stress sensor 154. The stress sensor 154 may include an ultrasonic stress sensor or the like. In embodiments, the controller 150 may be configured to determine if the stress measurements obtained via the stress sensor 154 are within an acceptable threshold to ensure high build quality. If the measurements are outside of the threshold, the controller 150 may modify various parameters of the build process. In embodiments, if an unacceptable amount of residual stress is detected, the controller 150 may modify operation of the compression rig 140 (e.g., by modifying the load application parameters such as force magnitude, and the like) to correct for the residual stress in the component 102 being outside of an acceptable range. In embodiments, if an unacceptable amount of residual stress is detected, the controller 150 may modify various operating parameters associated with the deposition head 122 (e.g., energy beam power, movement speed, material feed rate) to reduce residual stress in the component 102. As used herein, the term "residual stress" refers to the combination of thermal stress resulting from cooling after deposition and the mechanical stress resulting from the compression.

In the illustrated example, the deposition head 122 deposits feedstock material to fabricate the component 102 on the build table 104 while the build table 104 rotates in the counterclockwise direction R about the build table axis B. As the build table 104 continues to rotate the component 102 in the counterclockwise direction R, the feedstock material previously deposited by the deposition head 122 will encounter the load source 144 after being deposited from the deposition head 122. Thus, in the illustrated embodiment, the deposition head 122 acts on a particular portion of the component 102 before the load source 144 acts on that particular portion of the component and, similarly, the load source 144 acts on a particular portion of the component 102 after the deposition head 122 has acted on that particular portion of the component 102. Stated differently, because the build table 104 rotates in the counterclockwise direction R in the illustrated embodiment, the deposition head 122 is positioned before the load source 144 and the load source 144 is positioned after the deposition head 122. In embodiments, the temperature sensor 152 may be positioned before the load source 144 to ensure that the mechanical load is applied at the correct temperature and the stress sensor 154 may be positioned after the load source 144 to determine if the resulting stress is at a desired level (e.g., near zero for a stress-relieving treatment or a negative value if a counter-balancing treatment is being performed to promote grain refinement). In some examples, the temperature sensor 152 may be provided on the deposition assembly 120, for example, proximate the deposition head 122, so as to accurately measure temperature of the melted feedstock material being deposited therefrom. In some examples, the temperature sensor 152 may be provided proximate the load source 144. In embodiments, the temperature sensor 152 may include two or more temperature sensors such as a first temperature sensor provided near the melt pool and a second temperature sensor provided near the load source 144 and spaced apart from the first temperature sensor.

In the illustrated example, the compression rig 140 is provided on a base 202, which is positioned proximate to the deposition assembly 120 and the build table 104, and the deposition assembly 120 is provided on a pedestal 204. In other examples, the deposition assembly 120 may be provided on the base 202 or elsewhere.

In embodiments, at least a pair of tracks 206 is provided on an upper surface 208 of the base 202. The compression rig 140 may include a slidable support structure 210 that is configured to slide upon the tracks 206. As shown, the slidable support structure 210 may translate on the tracks 206, relative to the base 202, laterally in the Y-axis. Also, the compression rig 140 includes an actuator 212 arranged to cause translation of the slidable support structure 210 upon the tracks 206 in the Y-axis. Accordingly, the slidable support structure 210 has a bottom side (obscured from view) that is designed to mate with and ride on the tracks 206 to allow such translation.

In embodiments, at least a pair of tracks 214 is provided on a front surface 216 of the slidable support structure 210. The compression rig 140 may include a slidable positioning structure 220 that is configured to slide upon the tracks 214. As shown, the slidable positioning structure 220 may translate on the tracks 214, relative to the slidable support structure 210, vertically in the Z-axis. Also, the compression rig 140 includes an actuator 222 arranged to cause translation of the slidable positioning structure 220 upon the tracks 214 in the Z-axis. Accordingly, the slidable positioning structure 220 has a rear side (obscured from view) that is designed to mate with and ride on the tracks 214 to allow such translation.

In embodiments, the compression rig 140 includes an adjustable support member 230 that supports a compression head 246, as discussed herein. The adjustable support member 230 is coupled to the slidable positioning structure 220 via a first rotary joint 232. The first rotary joint 232 includes a first side/plate attached to the slidable positioning structure 220 and a second side/plate attached to the adjustable support member 230, and the first rotary joint 232 is configured to permit relative rotation between the first and second sides/plates, about an axis of rotation of the first rotary joint 232. Accordingly, as discussed in more detail herein and illustrated in FIG. 5, the adjustable support member 230 may rotate, relative to the slidable positioning structure 220, about a rotation axis of the first rotary joint 232 that, in the illustrated example, is parallel to the X-axis.

The compression rig 140 may include an actuator 234 arranged to cause rotation of the adjustable support member 230 about the rotation axis of the first rotary joint 232. In the illustrated example, the actuator 234 is supported on the slidable positioning structure 220. The actuator 234 includes a drive rod 236 and actuation of the actuator 234 causes extension or retraction of the drive rod 236 from the actuator 234. A distal end of the drive rod 236 is coupled to the second side/plate of the first rotary joint 232. Accordingly, extension or retraction of the drive rod 236 causes relative rotation between the first and second sides/plates of the first rotary joint 232 which thereby causes rotation of the adjustable support member 230 relative to the slidable positioning structure 220.

The compression head 246 is coupled to the adjustable support member 230 via a second rotary joint 240. The second rotary joint 240 defines an axis of rotation that, in the illustrated example, is parallel to Z-axis. The second rotary joint 240 includes a first side/plate attached to the adjustable support member 230 and a second side/plate attached to the compression head 246, and the second rotary joint 240 is configured to permit relative rotation between the first and second sides/plates, about its axis of rotation. Accordingly, the compression head 246 may rotate, relative to adjustable support member 230, about the rotation axis of the second rotary joint 240. Also, the compression rig 140 includes an actuator 242 arranged to cause rotation of the compression head 246 about the rotation axis of the second rotary joint 240. In the illustrated example, the actuator 242 is supported on the adjustable support member 230, and the actuator 242 includes a drive gear (obscured from view) having teeth that mesh with a driven gear 244 fixed on the second side/plate of the second rotary joint 240. The actuator 242 causes rotation of the drive gear, and rotation of the drive gear in turn rotates the driven gear 244 and the compression head 246 which is fixed to the driven gear 244.

Figure 2:
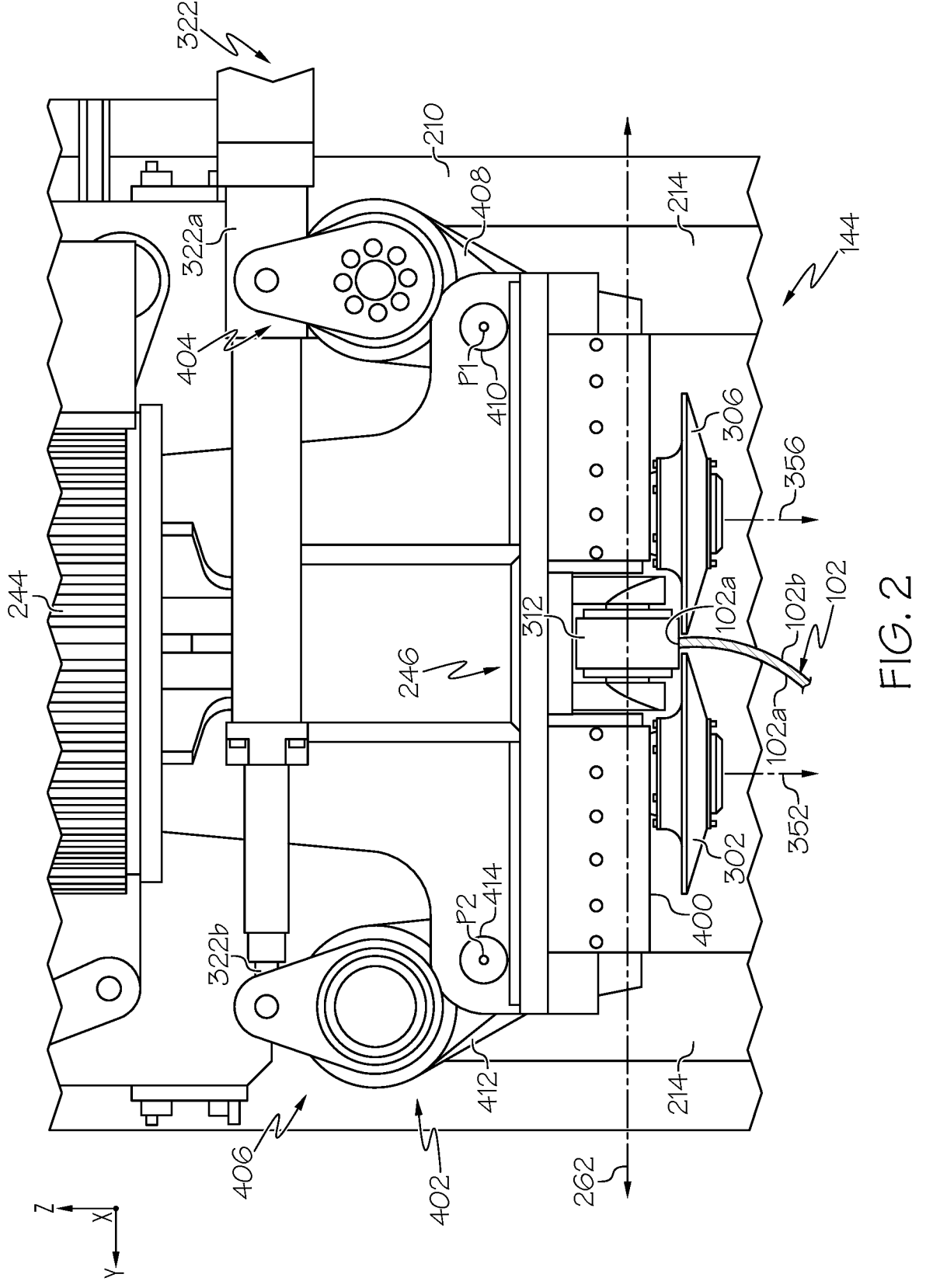
FIG. 2 schematically depicts a partial front view of a compression head of the additive manufacturing system of FIG. 1, according to one or more embodiments shown and described herein.

FIG. 2 illustrates a detailed front view of the compression head 246. As shown, the load source 144 is provided with a plurality of rollers arranged to apply compressive load to the component 102 at various portions of the component. The compression head 246 is configured to rotatably retain a plurality of rollers at various orientations so as to roll upon certain portions of the component 102. In some examples, the compression head 246 is configured to measure the compressive load applied by each roller through one or more sensors operably associated with each roller.

In embodiments, the compression head 246 supports at least one inside roller 302 positioned and oriented to contact the interior side surface 102a of the component 102 and to roll there-along as the component 102 is rotated by the build table 104. The compression head 246 also supports at least one outside roller 306 opposing the inside roller 302. The outside roller 306 is positioned and oriented to contact the exterior side surface 102b of the component 102 and to roll there-along as the component 102 is rotated by the build table 104. In the illustrated example, the side rollers 302, 306 are oriented such that they are each rotatable about a respective axis of rotation 352, 356 axis extending in the Z-axis. However, it will be appreciated that the side rollers 302, 306 may rotate about axes oriented along different vectors in the X-Z plane. Although only one inside roller 302 and one outside roller 306 are illustrated, it should be appreciated that a plurality of inside rollers 302 and a plurality of outside rollers 306 may be provided.

In addition, the compression head 246 supports at least one top roller 312 positioned and oriented to contact a top surface 102c of the component 102 and to roll there-along as the component 102 is rotated by the build table 104. It should be understood that use of the term "top surface" refers to an uppermost surface or layer of the component 102. As such, the top surface 102c of the component 102 is continually changing with each successive layer of material deposited by the deposition head 122. Here, the top roller 312 is oriented such that it is rotatable about an axis extending in the X-axis. However, it will be appreciated that the inside roller 302, the outside roller 306, and the top roller 312 may rotate about axes oriented along different vectors in the X-Z plane. Although only one top roller 312 is illustrated, it should be appreciated that a plurality of top rollers 312 may be provided.

The top roller 312 may provide compression to the top surface 102c of the component 102 via actuation of a linear actuator 231 (FIG. 1) which may be operated to drive the top roller 312 rotatably supported therein toward the component 102, for example, in the Z-axis. In embodiments, the linear actuator 231 extends through an aperture formed in the compression head 246 to permit the top roller 312 to move in the Z-axis relative to the side rollers 302, 306. Thus, the side rollers 302, 306 pinch the opposite sides of the component 102 via lateral compression while the top roller 312 presses the top surface of the component 102 via vertical compression. In embodiments, load sensors may be operatively associated with each of the side rollers 302, 306 and the top roller 312, so as to determine the load applied thereby.

In the illustrated example, the compression head 246 includes a frame 400 configured to support the side rollers 302, 306. The frame 400 is fixed to the driven gear 244 such that it rotates with the driven gear 244 upon actuation of the actuator 242 as described above. As shown, the side rollers 302, 306 are each rotatably coupled to the frame 400 such that each of the side rollers 302, 306 may rotate about the respective axis of rotation 352, 356. Also, as discussed in more detail herein, the side rollers 302, 306 may be pinched together or expanded apart along an axis 262 which extends parallel to the Y-axis via one or more compression actuators 322 supported on the frame 400. In addition, the top roller 312 may be pressed upward or downward in a direction parallel with the axes of rotation 352, 356 via the linear actuator 231 (FIG. 1) which may be supported on the adjustable support member 230. Additionally, the axis 262 is offset and can be perpendicular to the axes of rotation 352, 356.

Each of the side rollers 302, 306 and the top roller 312 are freely rotatable about their respective axes of rotation, and they are each rotated when brought into contact with their respective portion of the component 102 that they are designed to contact (i.e., the interior side surface 102a, the exterior side surface 102b, and the top surface 102c of the component 102, respectively) and as the component 102 is rotated. Thus, rotation of the component 102 causes roller rotation and the rollers need not include any separate drive train(s) to cause their independent rotation. However, in some examples, any one or more of the side rollers 302, 306 and the top roller 312 may be powered.

As discussed herein, the side rollers 302, 306 and the top roller 312 may each be configured to apply a compressive load to a respective portion of the component 102. For example, a first compression actuator may be configured to move the inside roller 302 toward the outside roller 306 and the interior side surface 102a of the component 102, and a second compression actuator may be configured to move the outside roller 306 toward the inside roller 302 and the exterior side surface 102b of the component 102. In some embodiments, the compression actuators cause movement of the respective side rollers 302, 306 independent of each other such that, for example, the inside roller 302 could be moved toward the outside roller 306 without a corresponding movement of the outside roller 306 toward the inside roller 302, and vice versa. In some examples, the compression actuator 322 operates to cause simultaneous movement of the side rollers 302, 306 together with corresponding movements toward the component 102, thereby pinching the component 102, and causing the side rollers 302, 306 to move apart from each other in unison with corresponding movements away from the component 102. In some examples where the side rollers 302, 306 operate in unison to move towards each other and away from each other, the compression actuator 322 may operate to pinch the side rollers 302, 306 together so as to enhance pinching compression force.

In embodiments in which the side rollers 302, 306 operate in unison to move towards each other and away from each other so as to enhance pinching compression force, a lever system 402 is provided. Referring still to FIG. 2, the lever system 402 includes a first pivot segment 404 provided at a proximal end 322a of the compression actuator 322 and a second pivot segment 406 provided at a distal end 322b of the compression actuator 322. As shown, the first pivot segment 404 and the second pivot segment 406 are illustrated as being provided at the proximal end 322a and the distal end 322b of the compression actuator 322. However, it should be appreciated that the first pivot segment 404 and the second pivot segment 406 may be coupled to a pair of individual compression actuators 322.

A first linkage member 408 pivotally couples the first pivot segment 404 to the outside roller 306. The first linkage member 408 is rotatably fixed to the frame 400 of the compression head 246 at a first pivot point P1 by a pivot pin 410, such as a shaft, rivet, or the like. Similarly, a second linkage member 412 pivotally couples the second pivot segment 406 to the inside roller 302. The second linkage member 412 is rotatably fixed to the frame 400 of the compression head 246 at a second pivot point P2 by a pivot pin 414, such as a shaft, rivet, or the like.

Thus, as the compression actuator 322 is operated in a first mode to retract and decrease a distance between the first pivot segment 404 and the second pivot segment 406, the first linkage member 408 and the second linkage member 412 rotate about the first pivot point P1 and the second pivot point P2, respectively, and cause the inside roller 302 and the outside roller 306 to move in opposite directions away from one another to increase a distance between the inside roller 302 and the outside roller 306. Alternatively, as the compression actuator 322 is operated in a second mode to extend and increase a distance between the first pivot segment 404 and the second pivot segment 406, the first linkage member and the second linkage member rotate about the first pivot point and the second pivot point, respectively, and cause the inside roller 302 and the outside roller 306 to move in opposite directions toward one another to increase a distance between the inside roller 302 and the outside roller 306.

Figure 3:
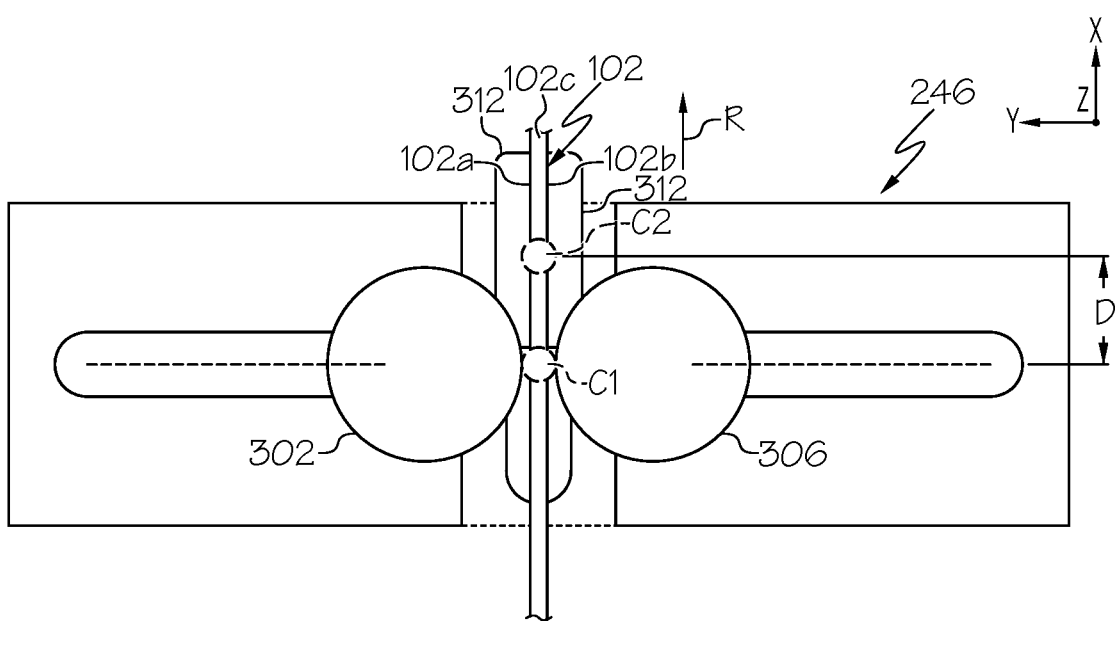
FIG. 3 schematically depicts a partial top view of the compression head of FIG. 2 including a pair of side rollers and a top roller, according to one or more embodiments shown and described herein.

It should be appreciated that, in embodiments, the top roller 312 may be positioned directly above a gap provided between the inside roller 302 and the outside roller 306 such that the top roller 312 and the side rollers 302, 306 simultaneously act on the same portion of the component 102. However, in other embodiments, the top roller 312 may be positioned offset from the gap provided between the side rollers 302, 306. For example, as shown in FIG. 3, the top roller 312 may be positioned forward or rearward of the side rollers 302, 306 in the direction of rotation of the component 102 to reduce strain on the same portion of the component 102 caused by compression of the side rollers 302, 306 and the top roller 312. As shown, a first contact point C1 is indicated on the component 102 to denote a location at which the side rollers 302, 306 apply a compression force on the component 102. A second contact point C2 is also indicated on the component 102 to denote a location at which the top roller 312 applies a compression force on the component. As shown, the second contact point C2 of the top roller 312 is spaced apart from the first contact point C1 of the side rollers 302, 306 by an axial decoupling distance D. Accordingly, the top roller 312 is applies a compression force onto a portion of the component 102 more forward of the compression force applied by the side rollers 302, 306. In other embodiments, the top roller 312 may be positioned rearwardly of the side rollers 302, 306 so as to apply a compression force onto a portion of the component 102 more rearward of the compression force applied by the side rollers 302, 306. As used herein, the terms "forward" and "rearward" refer to the counterclockwise rotation R of the component 102.

Figure 4:
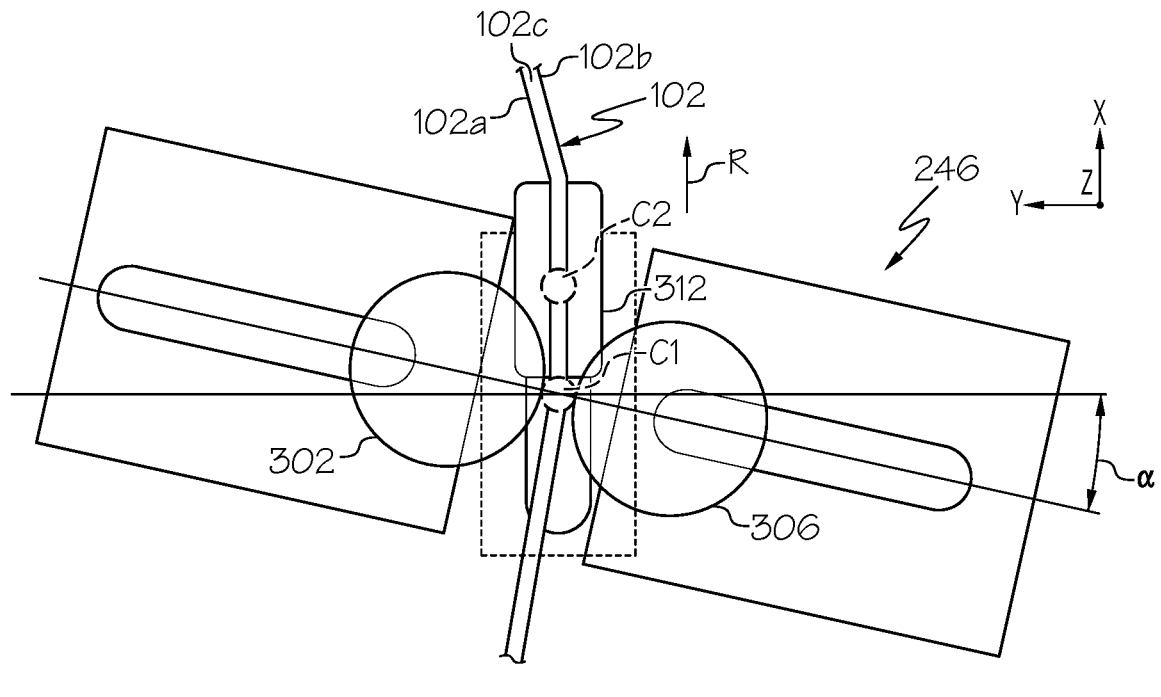
FIG. 4 schematically depicts a partial top view of the compression head of FIG. 2 with the pair of side rollers rotated relative to the top roller, according to one or more embodiments shown and described herein.

As discussed herein, in embodiments, the side rollers 302, 306 and/or the top roller 312 may be permitted to rotate about the Z-axis to account for a curvature in the component 102. For example, as shown in FIG. 4, the compression head 246 is rotated by the driven gear 244 (FIG. 2) so that the side rollers 302, 306 may conform to a curvature of the component 102. As discussed herein, the linear actuator 231 (FIG. 1) that controls a vertical position of the top roller 312 extends through an aperture formed in the compression head 246. As such, the compression head 246 is able to rotate, and thereby rotate the side rollers 302, 306, without simultaneously rotating the top roller 312. Accordingly, as shown in FIG. 4, an orientation of the top roller 312 defined by a rolling direction thereof remains parallel to the X-axis and offset by an offset angle $\alpha$ from an orientation of the compression head 246 extending along a longitudinal axis of the compression head 246, which extends across the side rollers 302, 306. In embodiments, the offset angle $\alpha$ is equal to or greater than 0.5 degrees and equal to or less than 60 degrees. In embodiments, the offset angle $\alpha$ is equal to or greater than 0.5 degrees and equal to or less than 20 degrees. However, in embodiments, it should be appreciated that the linear actuator 231 may be rotated about the Z-axis, either independently or in combination with the compression head 246, so that the top roller 312 and the side rollers 302, 306 are each rotated according to a curvature of the component 102.

Figure 5:
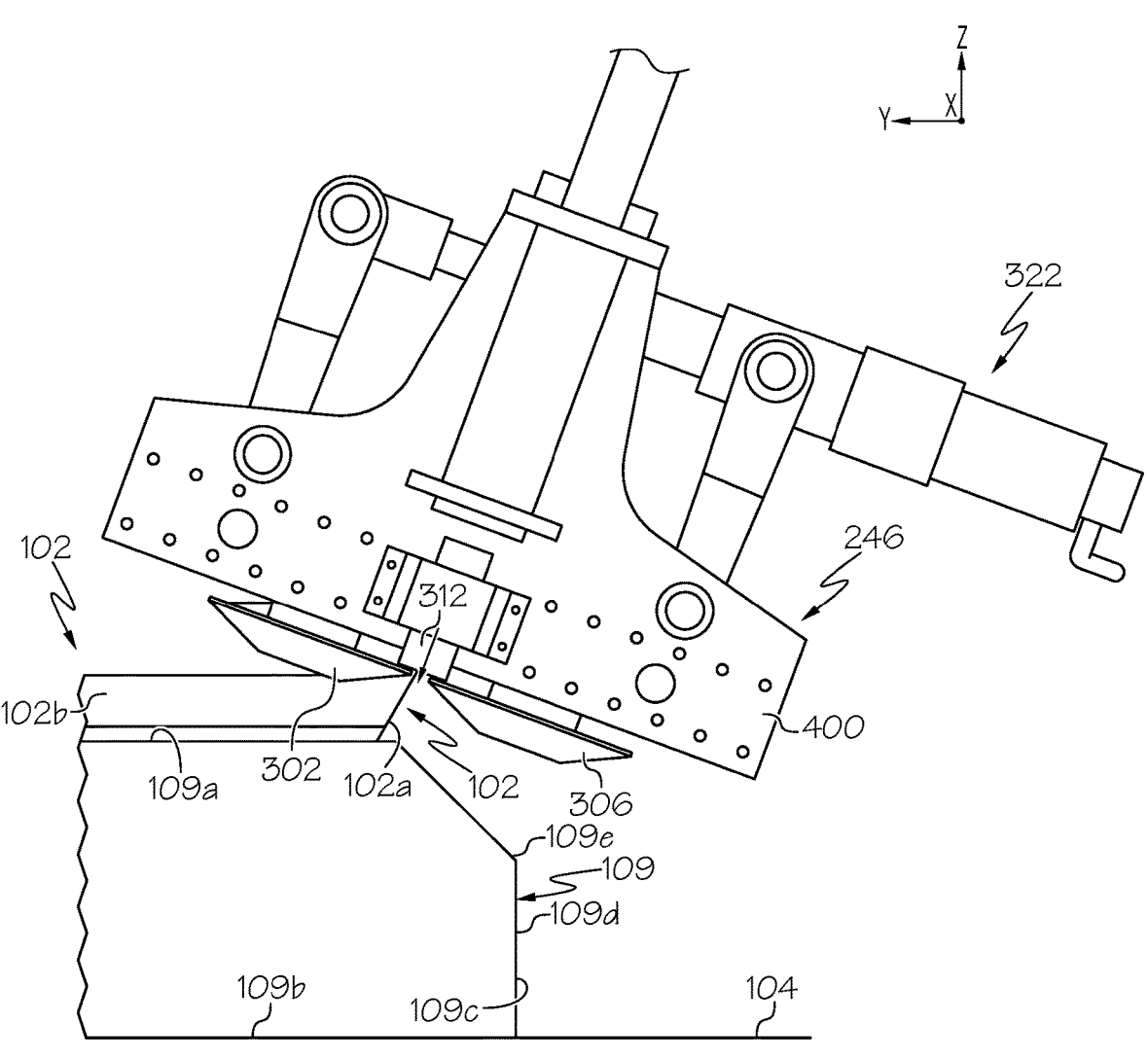
FIG. 5 schematically depicts a partial front view of the compression head of FIG. 2 rotated relative to a component built on a platform, according to one or more embodiments shown and described herein.

Referring now to FIG. 5, as discussed herein, the orientation of the compression head 246 may be rotated via the first rotary joint 232 (FIG. 1). This permits the side rollers 302, 306 and the top rollers 312 to be rotated relative to the component 102. However, during rotation the compression head 246 at the beginning of forming the component 102, the outside roller 306 may come into contact with the build table 104 based on the limited distance between the initial layers of the component 102 and the build table 104. Therefore, the platform 109 may be constructed to increase the distance between the build table 104 and the component 102. The platform 109 includes an upper surface 109a, an opposite lower surface 109b, and an outer surface 109c extending between the upper surface 109a and the lower surface 109b. In embodiments, as shown, the outer surface 109c of the platform 109 includes a vertical portion 109d extending from the lower surface 109b and an angular portion 109e extending from the vertical portion 109d and tapering inwardly to the upper surface 109a. Thus, when the compression head 246 is rotated by the first rotary joint 232, the increased distance between the build table 104 and the component 102 prevents contact between the outside roller 306 and the build table 104. In addition, the angular portion 109e provides a clearance to prevent contact with the outside roller 306.

Figure 6:
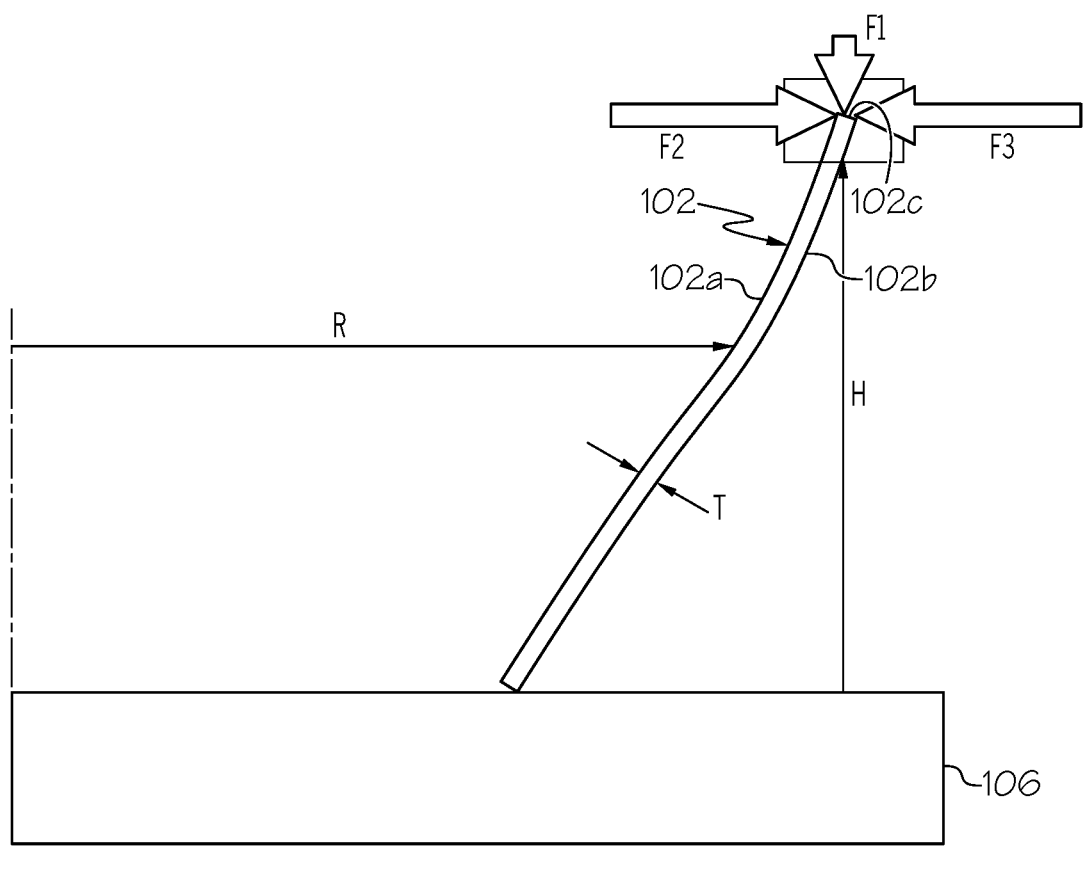
FIG. 6 schematically depicts a diagram of the pair of side rollers and the top roller of FIG. 4 applying a compression force on a component being built, according to one or more embodiments shown and described herein.

Referring now to FIG. 6, FIG. 6 depicts a partial view of the component with a radius R that varies with the height H. As shown, a force F1, a force F2, and a force F3 act on the top surface 102c of the component 102 by the top roller 312, the inside roller 302, and the outside roller 306, respectively. It should be appreciated that the benefit of utilizing the side rollers 302, 306 as opposed to the top roller 312 is that forces applied by the side rollers 302, 306 are self-equilibrated and balanced, while the force applied by the top roller 312 induces a significant reaction on the component 102 itself. An excessive reaction force on the component 102 may cause a buckling type of failure on structures that are too slender. Thus, the side rollers 302, 306 may be freely movable away from a respective surface of the component 102 to allow for uniform plastic strain on opposite sides of the component. Accordingly, this allows for self-balancing of the side rollers 302, 306 to compress the component 102 with a low buckling critical load. Accordingly, in embodiments, the component 102 has a slenderness ratio S, which permits a compression load greater than 50 kN (kilonewtons) to be applied by the top roller 312, the inside roller 302, and the outside roller 306. The slenderness ratio S is equal to H/T. In embodiments, the slenderness ratio S is equal to or greater than 1 and equal to or less than 200. In embodiments, the slenderness ratio S is equal to or greater than 5 and equal to or less than 100. In embodiments, the slenderness ratio S is equal to or greater than 10 and equal to or less than 60. In embodiments, the slenderness ratio S is equal to or greater than 25 and equal to or less than 40. By providing the specific slenderness ratio S disclosed herein, permits side rolling and compression on a component, such as component 102, while reducing the likelihood of resulting in part defects.

From the above, it is to be appreciated that defined herein is an additive manufacturing system for conducting compression of material while simultaneously conducting material deposition. The system includes a rotary build table configured to rotate about a vertical axis of the rotary build table, a deposition assembly having a deposition head through which a stream of melted feedstock material is deposited, and a compression rig including a compression head supporting an inside roller, an outside roller opposing the inside roller, and a top roller, the inside roller. The rollers are configured to apply a compressive load on surfaces of a component built on a build surface of the rotary build table.

Further aspects of the embodiments described herein are provided by the subject matter of the following clauses:

Clause 1. An additive manufacturing system for producing a component, the additive manufacturing system comprising: a deposition assembly having a deposition head through which melted feedstock material is deposited; and a compression rig comprising a compression head supporting an inside roller, an outside roller opposing the inside roller, and a top roller, the inside roller applying a compressive load onto an interior side surface of the component, the outside roller applying a compressive load onto an exterior side surface of the component, and the top roller applying a compressive load onto a top surface of the component.

Clause 2. The additive manufacturing system of clause 1, wherein the inside roller and the outside roller each rotate about a first axis of rotation and a second axis of rotation, respectively, and the top roller rotates about a second axis of rotation offset from the first axis of rotation and the second axis of rotation.

Clause 3. The additive manufacturing system of clause 2, wherein the compression rig includes at least one compression actuator moving at least one of the inside roller and the outside roller relative to the other of the inside roller and the outside roller.

Clause 4. The additive manufacturing system of clause 3, wherein the at least one compression actuator moves the inside roller and the outside roller in unison.

Clause 5. The additive manufacturing system of clause 4, further comprising a lever system, the lever system comprising: a first pivot segment provided at a proximal end of the at least one compression actuator; a second pivot segment provided at an opposite distal end of the at least one compression actuator; a first linkage member pivotally coupling the first pivot segment to the outside roller; and a second linkage member pivotally coupling the second pivot segment to the inside roller.

Clause 6. The additive manufacturing system of clause 5, wherein the first linkage member is pivotally fixed to a frame of the compression head at a first pivot point, and the second linkage member is pivotally fixed to the frame of the compression head at a second pivot point.

Clause 7. The additive manufacturing system of any one of clauses 3-6, wherein operation of the at least one compression actuator in a first mode moves the outside roller and the inside roller in opposite directions away from one another to increase a distance between the outside roller and the inside roller.

Clause 8. The additive manufacturing system of any one of clauses 3-7, wherein operation of the at least one compression actuator in a second mode moves the outside roller and the inside roller in opposite directions toward one another to decrease a distance between the outside roller and the inside roller.

Clause 9. The additive manufacturing system of any one of clauses 3-8, wherein the compression rig comprises an actuator for controlling a vertical position of the top roller independent of movement of the outside roller and the inside roller.

Clause 10. The additive manufacturing system of clause 9, further comprising a first rotary joint about which the compression head rotates about a fourth axis of rotation offset from the third axis of rotation.

Clause 11. The additive manufacturing system of clause 10, further comprising a second rotary joint about which the compression head rotates about a fifth axis of rotation extending parallel to the first axis of rotation and the second axis of rotation independent of the top roller.

Clause 12. The additive manufacturing system of clause 11, further comprising: a rotary build table rotatable about a vertical axis of the rotary build table, the rotary build table defining a horizontal build surface on which the component is built; and a platform is provided on the horizontal build surface of the rotary build table, the platform comprising: an upper surface on which the component is built; a lower surface opposite the upper surface; and an outer surface extending between the upper surface and the lower surface, the outer surface including a vertical portion extending from the lower surface, and an angular portion extending from the vertical portion and tapering inwardly to the upper surface, the vertical portion providing a clearance to prevent contact with the outside roller.

Clause 13. An additive manufacturing system for producing a component, the additive manufacturing system comprising: a rotary build table rotatable about a vertical axis of the rotary build table, the rotary build table defining a horizontal build surface on which the component is built; a deposition assembly having a deposition head through which melted feedstock material is deposited; a compression rig comprising a compression head positionable proximate to the deposition head, the compression head supporting an inside roller, an outside roller opposing the inside roller, and a top roller, the inside roller applying a compressive load onto an interior side surface of the component, the outside roller applying a compressive load onto an exterior side surface of the component, and the top roller applying a compressive load onto a top surface of the component; and a controller communicably coupled to the deposition assembly and the compression rig, wherein the controller is configured to control application of the compressive loads as the deposition head deposits melted feedstock material.

Clause 14. The additive manufacturing system of clause 13, wherein the controller is configured to the control a magnitude of the compressive load.

Clause 15. The additive manufacturing system of clause 13 or clause 14, wherein the compression rig includes a compression actuator communicatively coupled to the controller that moves the inside roller and the outside roller.

Clause 16. The additive manufacturing system of clause 15, wherein operation of the compression actuator in a first mode moves the outside roller and the inside roller in opposite directions away from one another, and wherein operation of the compression actuator in a second mode moves the outside roller and the inside roller in opposite directions toward one another.

Clause 17. A method of additively manufacturing a component, the method comprising: depositing melted feedstock material onto a build surface of a rotary build table to form the component; rotating the rotary build table about a vertical axis of the rotary build table; applying a compressive load onto an interior side surface of the component by an inside roller; applying a compressive load onto an exterior side surface of the component by an outside roller; and applying a compressive load onto a top surface of the component by a top roller.

Clause 18. The method of clause 17, wherein the outside roller and the inside roller are supported on a compression head, the compression head comprising a compression actuator and a lever system that maintains spacing between the inside roller and the outside roller to track a shape of the component.

Clause 19. The method of clause 17 or clause 18, wherein the inside roller and the outside roller each rotates about a first axis of rotation and a second axis of rotation, respectively, and the top roller rotates about a third axis of rotation perpendicular to the first axis of rotation and the second axis of rotation.

Clause 20. The method of clause 19, further comprising: rotating, by a first rotary joint, the compression head about a fourth axis of rotation extending perpendicular to the first axis of rotation, the second axis of rotation, and the third axis of rotation; and rotating, by a second rotary joint, the compression head about a fifth axis of rotation extending parallel to the first axis of rotation and the second axis of rotation independent of the top roller.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. An additive manufacturing system for producing a component, the additive manufacturing system comprising:
a deposition assembly having a deposition head through which melted feedstock material is deposited; and
a compression rig comprising a compression head supporting an inside roller, an outside roller opposing the inside roller, and a top roller, the inside roller applying a first compressive load onto an interior side surface of the component, the outside roller applying a second compressive load onto an exterior side surface of the component, and the top roller applying a third compressive load onto a top surface of the component; and
a lever system comprising:
a first pivot segment provided at a proximal end of a compression actuator;
a second pivot segment provided at an opposite distal end of the compression actuator;
a first linkage member pivotally coupling the first pivot segment to the outside roller; and
a second linkage member pivotally coupling the second pivot segment to the inside roller,
wherein, when a length of the compression actuator increases, a distance between the outside roller and the inside roller decreases,
wherein, when the length of the compression actuator decreases, the distance between the outside roller and the inside roller increases,
wherein the deposition head and the compression head are configured to move independently of one another in a circumferential direction about the component.

2. The additive manufacturing system of claim 1, wherein the inside roller and the outside roller rotate about a first axis of rotation and a second axis of rotation, respectively, and the top roller rotates about a third axis of rotation offset from the first axis of rotation and the second axis of rotation.

3. The additive manufacturing system of claim 1, wherein the compression actuator moves the inside roller and the outside roller in unison.

4. The additive manufacturing system of claim 1, wherein the first linkage member is pivotally fixed to a frame of the compression head at a first pivot point, and the second linkage member is pivotally fixed to the frame of the compression head at a second pivot point.

5. The additive manufacturing system of claim 1, wherein operation of the compression actuator in a first mode moves the outside roller and the inside roller in opposite directions away from one another to increase a distance between the outside roller and the inside roller.

6. The additive manufacturing system of claim 1, wherein operation of the compression actuator in a second mode moves the outside roller and the inside roller in opposite directions toward one another to decrease a distance between the outside roller and the inside roller.

7. The additive manufacturing system of claim 1, wherein the compression rig comprises a second actuator for controlling a vertical position of the top roller independent of movement of the outside roller and the inside roller.

8. The additive manufacturing system of claim 2, further comprising a first rotary joint about which the compression head rotates about a fourth axis of rotation offset from the third axis of rotation.

9. The additive manufacturing system of claim 8, further comprising a second rotary joint about which the inside roller and the outside roller rotate about a fifth axis of rotation extending parallel to the first axis of rotation and the second axis of rotation independent of the top roller.

10. The additive manufacturing system of claim 9, further comprising:

a rotary build table rotatable about a vertical axis of the rotary build table, the rotary build table defining a horizontal build surface on which the component is built; and a platform is provided on the horizontal build surface of the rotary build table, the platform comprising:

an upper surface on which the component is built;

a lower surface opposite the upper surface; and an outer surface extending between the upper surface and the lower surface, the outer surface including a vertical portion extending from the lower surface, and an angular portion extending from the vertical portion and tapering inwardly to the upper surface, the angular portion providing a clearance to prevent contact with the outside roller.

11. An additive manufacturing system for producing a component, the additive manufacturing system comprising:

a rotary build table rotatable about a vertical axis of the rotary build table, the rotary build table defining a horizontal build surface on which the component is built;

a deposition assembly having a deposition head through which melted feedstock material is deposited;

a compression rig comprising a compression head positionable proximate to the deposition head, the compression head supporting an inside roller, an outside roller opposing the inside roller, and a top roller, the inside roller applying a first compressive load onto an interior side surface of the component, the outside roller applying a second compressive load onto an exterior side surface of the component, and the top roller applying a third compressive load onto a top surface of the component; and a controller communicably coupled to the deposition assembly and the compression rig, wherein the controller is configured to independently control application of the first compressive load, the second compressive load, the third compressive load, and any combination thereof, as the deposition head deposits melted feedstock material; and a lever system comprising:

a first pivot segment provided at a proximal end of a compression actuator;

a second pivot segment provided at an opposite distal end of the compression actuator;

a first linkage member pivotally coupling the first pivot segment to the outside roller; and a second linkage member pivotally coupling the second pivot segment to the inside roller, wherein, when a length of the compression actuator increases, a distance between the outside roller and the inside roller decreases, wherein, when the length of the compression actuator decreases, the distance between the outside roller and the inside roller increases, wherein the deposition head and the compression head are configured to move independently of one another in a circumferential direction about the component.

12. The additive manufacturing system of claim 11, wherein the controller is configured to independently control a first magnitude of the first compressive load, a second magnitude of the second compressive load, and a third magnitude of the third compressive load.

13. The additive manufacturing system of claim 11, wherein operation of the compression actuator in a first mode moves the outside roller and the inside roller in opposite directions away from one another, and wherein operation of the compression actuator in a second mode moves the outside roller and the inside roller in opposite directions toward one another.

* * * * *